United States Patent
Abdulnour et al.

(10) Patent No.: US 10,601,688 B2
(45) Date of Patent: Mar. 24, 2020

(54) METHOD AND APPARATUS FOR DETECTING FAULT CONDITIONS IN A NETWORK

(71) Applicant: BAE SYSTEMS PLC, London (GB)

(72) Inventors: Mohamed Fakkar Abdulnour, Guildford (GB); Kelly Louise Hume, Guildford (GB); Paul Alan Ronald Mercer, Guildford (GB); Philip Trevor Whittall, Guildford (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/105,905

(22) PCT Filed: Dec. 18, 2014

(86) PCT No.: PCT/EP2014/078445
§ 371 (c)(1),
(2) Date: Jun. 17, 2016

(87) PCT Pub. No.: WO2015/091785
PCT Pub. Date: Jun. 25, 2015

(65) Prior Publication Data
US 2016/0323163 A1    Nov. 3, 2016

(30) Foreign Application Priority Data

Dec. 19, 2013  (EP) ..................................... 13275327
Dec. 19, 2013  (GB) ..................................... 1322571.9

(51) Int. Cl.
*H04L 12/26* (2006.01)
*H04L 12/24* (2006.01)
(Continued)

(52) U.S. Cl.
CPC .......... *H04L 43/0811* (2013.01); *H04L 12/66* (2013.01); *H04L 41/0636* (2013.01);
(Continued)

(58) Field of Classification Search
CPC ..... H04L 12/66; H04L 43/0817; H04L 67/18; H04L 41/145; H04L 43/50; H04L 41/147;
(Continued)

(56) References Cited

U.S. PATENT DOCUMENTS 6,738,811 B1   5/2004  Liang
7,225,250 B1   5/2007  Harrop
(Continued)

FOREIGN PATENT DOCUMENTS

WO  WO 00/48418 A1  8/2000
WO  WO 2007/002838 A2  1/2007
(Continued)

OTHER PUBLICATIONS

Huang et al. "In-Network PCA and Anomaly Detection," in Advances in Neural Information Processing Systems 19: Proceedings of the 2006 Conference, 1, MIT Press, 2007, pp. 617-624 (Year: 2007).*
(Continued)

*Primary Examiner* — Un C Cho
*Assistant Examiner* — Lalita W Pace
(74) *Attorney, Agent, or Firm* — Scully, Scott, Murphy & Presser, PC

(57) ABSTRACT

A method and apparatus are provided for detecting a fault condition in a network, making use of standard parameter data generated by a network termination device of a user of the network, the method comprising, in a training phase, the remote retrieval of selected parameters from a predetermined set of users' network termination devices in order to generate one or more representative models of expected operational status using the retrieved parameters and, in a monitoring phase, determining a measure of operational status for the set of users at some future time and comparing that with a corresponding expected model measure. Parameter retrieval takes place over substantially the same path
(Continued)

through the network as used to supply services to a respective network termination device so that the models are generated in respect of communications over those elements of network infrastructure likely to affect operational status of the respective set of users in the event of a fault condition. Any significant variation from model measures may be indicative of a fault condition. Preferred measures of operational status include connectivity status and service status.

16 Claims, 7 Drawing Sheets

(51) Int. Cl.
 *H04L 12/66* (2006.01)
 *H04L 29/08* (2006.01)
(52) U.S. Cl.
 CPC .......... *H04L 41/145* (2013.01); *H04L 41/147* (2013.01); *H04L 41/16* (2013.01); *H04L 43/0817* (2013.01); *H04L 67/18* (2013.01)
(58) Field of Classification Search
 CPC ....... H04L 43/00; H04L 41/14; H04L 41/142; H04L 41/12; H04L 41/0631; H04L 41/0636; H04L 41/064; H04L 41/0645; H04L 41/5035; H04W 24/08; H04W 24/10; H04W 16/22
 See application file for complete search history.

(56) References Cited

U.S. PATENT DOCUMENTS

| | | | |
|---|---|---|---|
| 8,908,539 B1* | 12/2014 | Pani | H04L 43/0811 370/248 |
| 9,939,485 B1* | 4/2018 | Johnson | G08B 21/182 |
| 2001/0021987 A1 | 9/2001 | Govindarajan et al. | |
| 2002/0133587 A1 | 9/2002 | Ensel et al. | |
| 2004/0088406 A1 | 5/2004 | Corley et al. | |
| 2004/0106400 A1 | 6/2004 | Woo et al. | |
| 2004/0168100 A1 | 8/2004 | Thottan et al. | |
| 2005/0163060 A1 | 7/2005 | Riley et al. | |
| 2006/0020866 A1 | 1/2006 | Lo et al. | |
| 2007/0043535 A1 | 2/2007 | Belden | |
| 2007/0088534 A1 | 4/2007 | MacArthur et al. | |
| 2008/0250265 A1 | 10/2008 | Chang et al. | |
| 2010/0027431 A1* | 2/2010 | Morrison | H04L 41/0681 370/252 |
| 2010/0046377 A1 | 2/2010 | Ryan et al. | |
| 2010/0071061 A1 | 3/2010 | Crovella et al. | |
| 2010/0138750 A1 | 6/2010 | Trinler | |
| 2010/0192002 A1 | 7/2010 | Su et al. | |
| 2010/0290362 A1* | 11/2010 | Croot | H04L 43/00 370/252 |
| 2011/0107155 A1 | 5/2011 | Hirose et al. | |
| 2011/0250895 A1 | 10/2011 | Wohlert et al. | |
| 2012/0155323 A1* | 6/2012 | Ramachandran | H04W 24/04 370/254 |
| 2012/0309421 A1 | 12/2012 | Nabbefeld | |
| 2013/0111535 A1* | 5/2013 | Howe | H04L 29/06027 725/109 |
| 2013/0151692 A1 | 6/2013 | White | |
| 2013/0279354 A1* | 10/2013 | Ekman | H04W 24/00 370/252 |
| 2014/0050081 A1 | 2/2014 | Wagner | |
| 2014/0052676 A1 | 2/2014 | Wagner et al. | |
| 2014/0056126 A1* | 2/2014 | Bencheck | H04L 69/40 370/228 |
| 2014/0078973 A1 | 3/2014 | Kazmi et al. | |
| 2015/0065121 A1* | 3/2015 | Gupta | H04W 24/08 455/424 |

FOREIGN PATENT DOCUMENTS

| | | |
|---|---|---|
| WO | WO 2007/048738 A1 | 5/2007 |
| WO | 2012/150107 A1 | 11/2012 |

OTHER PUBLICATIONS

TR-098 Internet Gateway Device Data Model for TR-069; Issue: 1 Amendment 2; Issue Date: Sep. 2008, pp. 10, 14 (Year: 2008).*
International Search Report dated Mar. 18, 2015 issued in PCT/EP2014/078445.
Extended European Search Report dated May 26, 2014 issued in EP 13275327.8.
GB Search Report dated Jun. 10, 2014 issued in GB 1322571.9.
International Preliminary Report on Patentability and Written Opinion dated Jun. 30, 2016 from related PCT/EP2014/078445.
International Search Report and Written Opinion dated Mar. 13, 2015 issued in PCT/EP2014/078444.
Extended European Search Report dated Mar. 11, 2014 issued in EP 13275328.6.
GB Search Report dated Jun. 12, 2015 issued in GB1422561.9.
International Preliminary Report on Patentability and Written Opinion dated Jun. 30, 2016 from related PCT/EP2014/078444.
Broadband Forum at http://www.broadband-forum.org—TR-069: CPE WAN Management Protocol v1.1, Nov. 2006, (CWMP), pp. 1-131.
Broadband Forum at http://www.broadband-forum.org—TR-098: Internet Gateway Device Model for TR-069, Issue 1.1, Nov. 2006, pp. 1-119.
I.T. Jolliffe, "Principal Component Analysis", Apr. 2002, Springer-Verlag , pp. 1-518.
U.S. Appl. No. 15/105,113, filed Jun. 16, 2016.
Office Action dated Sep. 27, 2017 from U.S. Appl. No. 15/105,113.
Notice of Allowance dated Aug. 13, 2018 from U.S. Appl. No. 15/105,113.
Office Action dated Apr. 27, 2018 from U.S. Appl. No. 15/105,113.

* cited by examiner

Fig. 2

| ROOT_SERVICE_INSTANCE_ID SVLAN | AMSAN ID | AMSAN Code (Area) | AMSAN port to FMSAN | FMSAN port to AMSAN | FMSAN ID | FMSAN Code (Area) | FMSAN port to EEA | EEA port to FMSAN | EEA ID | EEA Code (Area) | IEA ID | IEA Code (Area) | IEA port to BRAS | BRAS port to IEA | BRAS ID | BRAS Code (Area) | MTOSI_PORT _NAME Card and Port on the BRAS |
|---|---|---|---|---|---|---|---|---|---|---|---|---|---|---|---|---|---|
| IPSV00000458 | 226366 | L/DOM/A | 1-2/0/0 | 5-4-1 | 229570 | L/DOM/J | 7-1-1 | 6/25/1 | 227723 | L/GRA/B | 448274 | L/STE/J | 2/2/1/1 | 1/1/1 | 254761 | L/STE/J | 1/1/1 |
| IPSV00002213 | 260434 | L/KIP/A | 1-2/0/0 | 5-4-1 | 233429 | L/KIP/A | 7-1-1 | 6/25/1 | 227740 | L/BER/B | 448220 | L/FAR/E | 7/2/7 | 2/1/1 | 254753 | L/FAR/E | 1/2/1 |
| IPSV00002812 | 578810 | WO/1K | 1-2/0/0 | 5-4-1 | 360188 | WO/1K | 7-1-1 | 1/2/3/1 | 325329 | SL/H | 448273 | SL/H | 7/2/3 | 3/1/1 | 287152 | SL/H | 1/3/1 |
| IPSV00003376 | 261524 | L/PUT/H | 1-2/0/0 | 5-4-1 | 429402 | L/PUT/H | 7-1-1 | 6/24/1 | 227716 | L/EAL/K | 448273 | SL/H | 8/2/1 | 3/1/1 | 324685 | SL/H | 1/3/1 |
| IPSV00003458 | 582690 | RG/K | 1-2/0/0 | 5-4-1 | 360191 | RG/K | 7-1-1 | 6/21/1 | 325329 | SL/H | 448273 | SL/H | 3/2/6 | 4/1/1 | 324685 | SL/H | 1/4/1 |
| ... | ... | ... | ... | ... | ... | ... | ... | ... | ... | ... | ... | ... | ... | ... | ... | ... | ... |
| ↑ 105 | ↑ 180 | ↑ 185 | ↑ 190 | ↑ 175 | ↑ 160 | ↑ 165 | ↑ 170 | ↑ 155 | ↑ 145 | ↑ 150 | ↑ 130 | ↑ 135 | ↑ 140 | ↑ 115 | ↑ 110 | ↑ 120 | ↑ 125 |

↙ 100

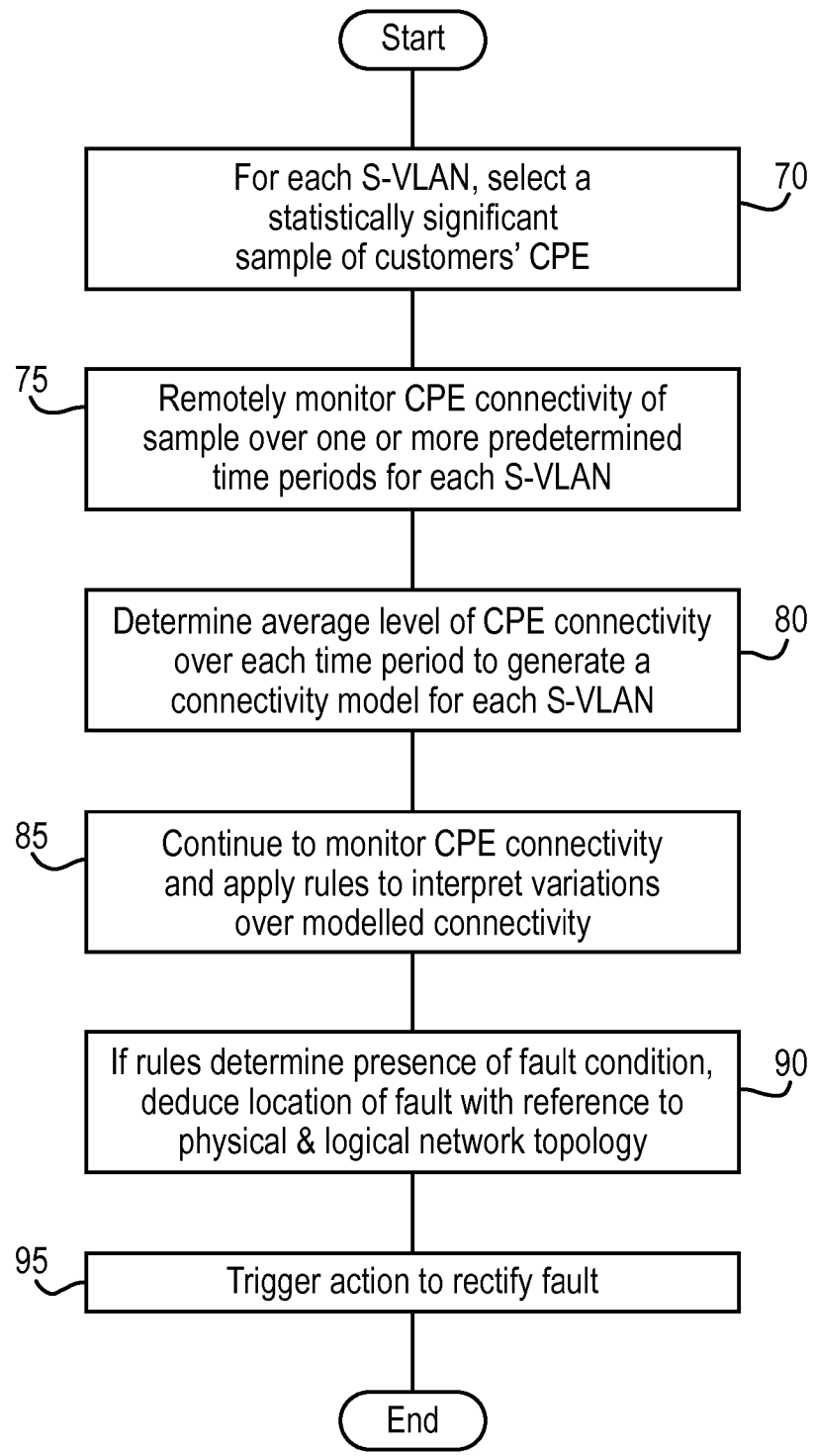

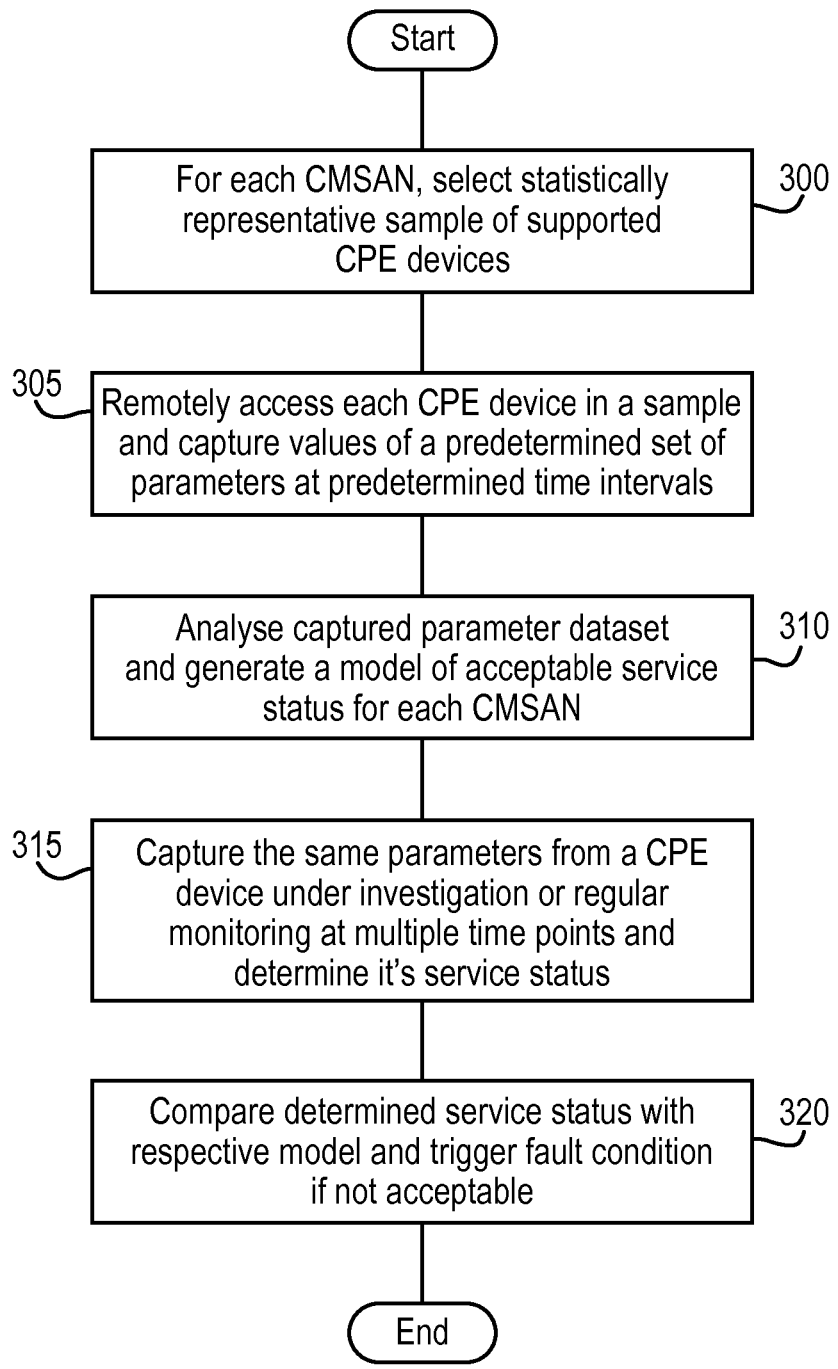

Fig. 6

| System Parameters | Network Interface Parameters | IP Interfaces Parameters | DSL Parameters |
|---|---|---|---|
| Time.SystemUpTime | WLAN.Intf.1.Stats.ValidPacketsReceived | WLAN.Intf.1.Stats.ValidPacketsReceived | DSL.Status_Value |
| DeviceConfig.ConfigLastError | WLAN.Intf.1.Stats.ValidPacketSent | WLAN.Intf.1.Stats.ValidPacketSent | DSL.DataPath_Value |
| System.Stats.CPUAverageLoad | WLAN.Intf.2.Stats.ValidPacketsReceived | WLAN.Intf.2.Stats.ValidPacketsReceived | DSL.UpstreamCurrRate_Value |
| Time.Time | WLAN.Intf.2.Stats.ValidPacketSent | WLAN.Intf.2.Stats.ValidPacketSent | DSL.DownstreamCurrRate_Value |
| Time.Date | | WLAN.Intf.1.Stats.ValidPacketsReceived | DSL.UpstreamMaxRate_Value |
| | | WLAN.Intf.1.Stats.ValidPacketSent | DSL.DownstreamMaxRate_Value |
| | | WLAN.Intf.2.Stats.ValidPacketsReceived | DSL.UpstreamNoiseMargin_Value |
| | | WLAN.Intf.2.Stats.ValidPacketSent | DSL.DownstreamNoiseMargin_Value |
| | | WLAN.Intf.1.Stats.ValidPacketsReceived | DSL.UpstreamAttenuation_Value |
| | | WLAN.Intf.1.Stats.ValidPacketSent | DSL.DownstreamAttenuation_Value |
| | | WLAN.Intf.2.Stats.ValidPacketsReceived | DSL.UpstreamPower_Value |
| | | WLAN.Intf.2.Stats.ValidPacketSent | DSL.DownstreamPower_Value |
| | | WLAN.Intf.1.Stats.ValidPacketsReceived | DSL.Stats.CurrentDay.Start_Value |
| | | WLAN.Intf.1.Stats.ValidPacketSent | DSL.Stats.CurrentDay.LossOfFraming_Value |
| | | WLAN.Intf.2.Stats.ValidPacketsReceived | DSL.Stats.CurrentDay.LossOfSignal_Value |
| | | WLAN.Intf.2.Stats.ValidPacketSent | DSL.Stats.CurrentDay.LossOfPower_Value |
| | | WLAN.Intf.1.Stats.ValidPacketsReceived | DSL.Stats.CurrentDay.ErroredSecs_Value |
| | | WLAN.Intf.1.Stats.ValidPacketSent | DSL.Stats.CurrentDay.ReceiveBlocks_Value |
| | | WLAN.Intf.2.Stats.ValidPacketsReceived | DSL.Stats.CurrentDay.TransmitBlocks_Value |
| | | WLAN.Intf.2.Stats.ValidPacketSent | DSL.Stats.CurrentDay.SeverlyErroredSecs_Value |
| | | WLAN.Intf.1.Stats.ValidPacketsReceived | DSL.Stats.CurrentDay.LinkRetrain_Value |
| | | WLAN.Intf.1.Stats.ValidPacketSent | DSL.Stats.CurrentDay.CellDelin_Value |
| | | WLAN.Intf.2.Stats.ValidPacketsReceived | DSL.Stats.CurrentDay.CRCErrors_Value |
| | | WLAN.Intf.2.Stats.ValidPacketSent | DSL.Stats.CurrentDay.FECErrors_Value |

METHOD AND APPARATUS FOR DETECTING FAULT CONDITIONS IN A NETWORK

The present invention relates to network maintenance and in particular, but not exclusively, to a method and apparatus for detecting fault conditions in a network and for determining a most likely source of the detected fault condition. The present invention finds particular application in fault detection and diagnosis for Internet Protocol (IP) and Ethernet Protocol networks but it may be arranged to operate in respect of other types of network.

From a first aspect, the present invention resides in a method for detecting a fault condition in a network, the network having a plurality of network users each having, linked to the network, a network termination device for accessing services over the network, the method comprising the steps:

(i) in a training phase, remotely establishing a connection through the network to a network termination device of each of a predetermined set of users, the connection following substantially the same path through the network as that used by the respective network termination device to access the services over the network, thereby to retrieve parameter data generated by the device comprising values of a first predetermined set of parameters indicative of a measure of connectivity status of the device with respect to the network;

(ii) applying one or more types of analysis to the retrieved parameter data thereby to generate one or more models of expected device connectivity for the network termination devices of the set of users; and (iii) in a monitoring phase, remotely retrieving values for the first predetermined set of parameters from a network termination device of a selected user and comparing the measure of connectivity status derived from the retrieved parameter values for the selected user with an expected measure of device connectivity indicated by a corresponding model of device connectivity generated at step (ii) thereby to identify a variation in connectivity status for the selected user's device indicative of a fault condition in the network.

Example embodiments of the present invention are directed to determining one or more measures of connectivity status using data generated at a user's network termination device, otherwise known as customer premises equipment (CPE), rather than using data generated by network equipment, for example alarm data. By analysing connectivity with elements of the network from the perspective of a customer's network termination equipment, a view of network performance is provided from the edge of a network. Furthermore, by retrieving data over substantially the same path through the network as used to supply network services to respective users, the generated models of connectivity are representative of expected connectivity over the respective portions of the network and hence in respect of identifiable elements of network infrastructure.

Fault conditions detected from the perspective of a customer's network termination equipment have been found by the inventors not only to map more directly onto reported fault conditions, as may be received by support engineers in a network provider's call centre, but also to anticipate fault conditions before they are reported by users, leading to significant improvements in key performance indicators (KPI). Analysis methods according to preferred embodiments of the present invention enable a more rapid detection and location of a fault condition, wherever it may occur in the network.

In modelling the 'connectivity status' from the perspective of a predetermined set of users, an assumption is made that those users are experiencing an 'acceptable' or 'normal' level of network performance. These models then form the basis for detecting divergent behaviour that may be due to a fault condition or a configuration error, for example, which justifies an alert to investigate further.

In one example embodiment, at step (i) of the method, the predetermined set of users comprises users having access to the services over a particular portion of the network or from a particular geographical area. In a typical network architecture there will be a portion of interconnected network equipment serving a particular geographical area or a given geographical concentration of network users. By generating a different model of connectivity status for different geographical groupings of customers, local network characteristics are more likely to be taken into account in the data when modelling 'normal' connectivity status of users. This approach also provides for a greater resolution in network fault detection and diagnosis as a more limited set of network equipment is likely to be involved in delivering network services to those users than if an attempt was made to model connectivity status of the entire network.

For the reasons given above, at step (iii) of the method, the corresponding model is a model generated in respect of a portion of the network or a geographical area associated with the selected user's network termination device. In this way, the modelled characteristics of that portion of the network serving the selected user form the basis for determining whether a fault condition exists, rather than, for example, some broader measure of normal connectivity status taken from a wider sample of retrieved parameter data.

In an example embodiment, the first predetermined set of parameters includes parameters selected for determining the measure of connectivity of the respective device. It has been found that if the first set of parameters includes a parameter indicative of at least one of: time; date; and a software or firmware version number for the respective network termination device, then a reliable measure of connectivity can be obtained without needing to retrieve greater quantities of data.

In a further example embodiment, a second measure of 'operational' status for a user may be derived, comprising a measure of service status, wherein the parameter data includes a second predetermined set of parameters selected as being indicative of service status for the respective network termination device. To model service status and to provide a basis for comparison, at step (ii), the one or more types of analysis include the application of principal component analysis to retrieved parameter data for the second set of parameters and step (ii) further comprises generating one or more models characterising service status for the network termination devices of the predetermined set of users in terms of one or more determined regions of acceptable service status in a space defined by the principal components of retrieved parameter data for the second set of parameters.

In particular, step (iii) further comprises projecting the retrieved parameter data for the second set of parameters into the space defined by the principal components calculated at step (ii) and comparing the position of the projected data with the one or more determined regions of acceptable service status thereby to identify a variation indicative of a fault condition in the network.

The measure of service status is for example indicative of communications performance over an access network portion of the network and the parameters of the second set of parameters are selected as being indicative of communications performance over that portion of the access network that links to a respective network termination device. The access network may comprise copper lines linking the network termination devices of the predetermined set of users to the network and the second set of parameters may include parameters indicative of communications performance over a respective copper line.

In a typical application of the method from this first aspect of the present invention, the network is an internet protocol network and the predetermined set of parameters comprise one or more parameters defined in a standard data model for internet gateway devices.

From a second aspect, the present invention resides in an apparatus for detecting fault conditions in a network, the network having a plurality of network users each having, linked to the network, a network termination device for accessing services over the network, the apparatus comprising:

a data retrieval module having an interface to the network and arranged to establish a communications link to a user network termination device over substantially the same path through the network as that used by the user network termination device to access services over the network and to retrieve parameter data therefrom comprising values for a first predetermined set of parameters generated by the device and indicative of a measure of connectivity status for the device with respect to the network;

an analysis module for processing parameter data retrieved by the data retrieval module from the network termination device of each of a predetermined set of users and for generating one or more models of expected device connectivity with respect to at least a portion of the network accessed by the set of users; and fault detection means for comparing the measure of connectivity status derived from values for the first predetermined set of parameters retrieved by the data retrieval module from the network termination device of a user with a corresponding said model of device connectivity and for recognising a fault condition in the network in the event that the derived measure of connectivity status for the user diverges from an expected device connectivity indicated by the corresponding said model.

In an example implementation, the analysis module is arranged to generate one or models of connectivity in respect of the network termination devices of the predetermined set of users and a fault condition is indicated in the event that a given measured level of connectivity in respect of the set of users varies significantly from a level indicated by a corresponding connectivity model. To this end, the first predetermined set of parameters preferably includes a first set of parameters indicative of at least one of: time; date; and software or firmware version number for a respective network termination device.

In support of a different type of fault detection, the parameter data includes a second predetermined set of parameters indicative of service status of a respective device, the second set of parameters comprising parameters indicative of at least one of: number of data packets received; number of data packets sent; data rate; data errors; noise; and signal attenuation over a respective link from the network termination device to the network, in particular a copper line. The preferred second set of parameters is particularly suited to centralised monitoring of the communications performance being experienced from a customer's perspective over the copper local access network of legacy telecommunications networks.

From a third aspect, the present invention resides in a network management system incorporating means for implementing the method according to example embodiments of the present invention.

From a fourth aspect, the present invention resides in a computer program product comprising a data carrier having stored thereon, or means for accessing, computer program code means which when loaded and executed on a computer are arranged to implement the method according to example embodiments of the present invention.

Example embodiments of the present invention will now be described in more detail with reference to the accompanying drawings, of which:

FIG. 2 is an example extract from an inventory table of network equipment for the network architecture shown in FIG. 1;

FIG. 3 is flow diagram summarising a fault detection process based upon an analysis of connectivity data according to a preferred embodiment of the present invention;

FIG. 5 is a flow diagram summarising a fault detection process based upon an analysis of service status according to a preferred embodiment of the present invention;

FIG. 6 is a table listing a preferred set of parameters for use in determining service status from a customer perspective, according to a preferred embodiment of the present invention.

Figure 1:
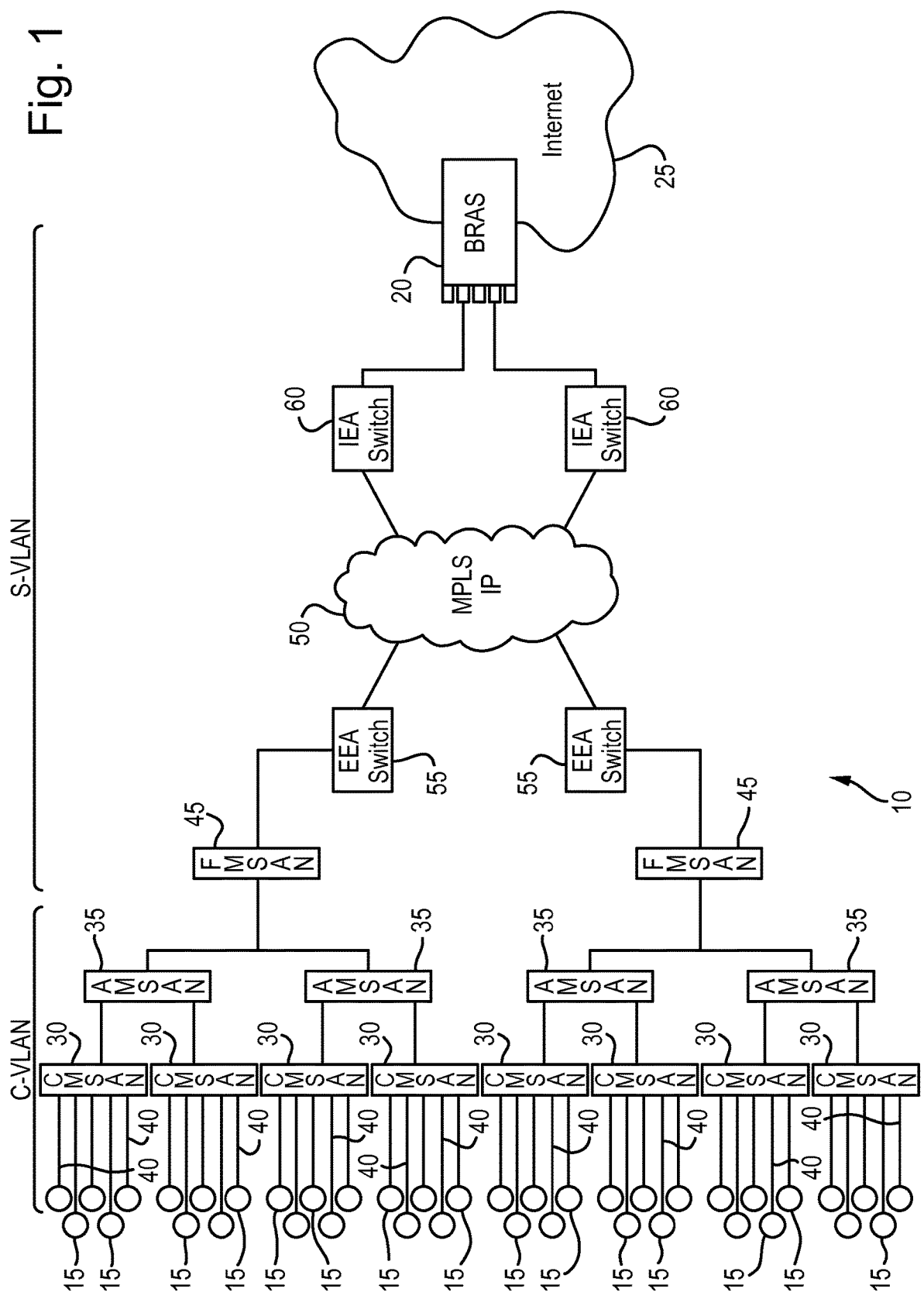
FIG. 1 is a diagram showing the main elements in a typical broadband IP network serving retail customers.

A typical broadband IP network, as may be used by a telecommunications service provider to offer internet access to retail customers over conventional telephone lines, is shown in FIG. 1. Conventional telephone lines are likely to be copper wire pairs linking a customer's network termination equipment, conventionally known as 'customer premises equipment' (CPE), to equipment located in a respective local telephone exchange.

Referring to FIG. 1, a portion of a typical 'broadband' communications service provider's IP network 10 is shown linking the CPE devices 15 of a number of customers of broadband data services to a service provider's Broadband Remote Access Server (BRAS) 20. The BRAS 20 provides access to the wider Internet 25 or to other Communications Service Provider (CSP) networks. Physically, the network 10 is made up of an Access network, an Aggregation network and a Core network. The Core network is arranged to route IP traffic between aggregated portions of the access network and a corresponding BRAS 20. The access network comprises the copper line plant and interfacing equipment required to make the physical link to each customer's CPE device 15, typically a Digital Subscriber Line (DSL) modem or router. The Aggregation network provides a physical and logical concentration of connectivity between multiple geographical portions of the Access network and the Core network.

In the network 10 in which communications services are being provided over legacy copper-based local networks, the access network comprises Copper Multi-Service Access Node (CMSAN) equipment 30, located typically in each local telephone exchange, to support communications services being provided over copper lines 40 that link each customer's CPE device 15 to the local telephone exchange. In such a network, IP communications may be extended to CPE devices 15 over the copper lines 40 using Digital Subscriber Line (DSL) signalling. Logically, the access network may be defined as a number of Copper Virtual Local Area Networks (C-VLAN), each C-VLAN defining a 'tunnel' of connectivity between a particular group of customers' CPE devices 15, via one or more respective instances of CMSAN equipment 30, to a corresponding instance of Aggregation MSAN (AMSAN) equipment 35, the AMSAN 35 representing a first level of aggregation in the Aggregation network. Typically, each instance of AMSAN equipment 35 aggregates traffic from two or more instances of CMSAN equipment 30.

The Aggregation network comprises AMSAN equipment 35 at the first level of aggregation, feeding into Fibre Multi-Service Access Nodes (FMSAN) 45 at a second and final level of aggregation, each of which interface to the Core network. However, the AMSAN 35 and FMSAN 45 layer may be combined to form a single MSAN aggregation layer within typical implementations of a broadband IP network.

The Core network may comprise a Multi-protocol Label Switching (MPLS) IP network 50, having a number of Egress Label-switched Routers—EEA Switch 55—each arranged to forward IP packets over a Label-Switched Path (LSP) established through the MPLS network 50 with one of a number of Ingress Label-switched Routers—IEA Switch 60—which link to the BRAS 20. Each instance of FMSAN equipment 45 in the Aggregation network would typically interface to one EEA switch 55 at the edge of the Core network.

Logically, the path that IP traffic takes through the physical network 10 between a point of entry to the Aggregation network at an AMSAN 35 and the BRAS 20 is defined by a Service Virtual Local Area Network (S-VLAN). The S-VLANs are defined at the AMSAN 35 level and define a tunnel of connectivity between an edge point 15 of the Access network and the BRAS 20. Typically, groups of up to 1000 users (CPE devices 15) are defined on each AMSAN 35, each group making up one S-VLAN.

Each of the equipment types 20, 30, 35, 45, 55 and 60 in the network 10 include functionality to generate an alarm signal in the event of a notifiable fault condition within the equipment. The scope of this alarm generating functionality varies according to equipment supplier. In known network management arrangements, the alarm signals from all the network equipment may be collected and processed to understand the effect of certain alarm conditions on the performance of the network 10 and in the hope of determining a particular equipment item causing an observed or reported degradation in network performance. However, given the volume of alarm data typically generated by the equipment deployed across a typical service provider's network, it is very difficult for the service provider to deduce the effect that the reported alarm conditions are likely to be having on customer service and network performance within a short-enough time period to be useful, for example before customers begin reporting that their broadband service is degraded or has failed completely. In the absence of a particular reported customer service issue, it is often difficult to decide where to focus the alarm data analysis to any useful effect as fault conditions may arise anywhere between a customer's CPE device 15 and the BRAS 20. Recognising the difficulty, service providers may connect further test equipment at strategically selected points of the network, with associated data processing capability, to monitor network performance in the hope of detecting or anticipating customer-affecting fault conditions. However, such equipment is expensive to purchase, implement and maintain, provides limited network coverage, has a limited response time in detecting potential network fault conditions, and is generally unable to serve the needs of individual customers experiencing service problems.

The present invention aims to overcome the limitations of current methods by deriving network performance data from a CPE 15 perspective. The innovation that enables this allows not only the actual customer service experience to be monitored, first-hand, but also enables fault detection in any part of the link between a CPE device 15 and the BRAS 20, including the copper line plant 40, in a fraction of the time required by current methods.

In the specific description that follows, preferred fault detection methods according to preferred embodiments of the present invention will be described in the context of the typical broadband network structure shown in FIG. 1. A preferred apparatus and data processing techniques will be then be described for implementing the preferred methods.

To identify and locate fault conditions, the preferred methods of the present invention comprise a number of different but complementary analyses of data retrieved by remote download, over connections established through the service provider's network 10 from a BRAS 20, of parameters available from customers' CPE devices 15. Preferably these analyses are directed to CPE connectivity, CPE service status, including communications performance over the copper line connection 40 between customers' CPE devices 15 and respective CMSAN equipment 30, and detection of service-affecting non-network faults, for example configuration errors.

Beginning with an analysis of CPE connectivity, it is assumed that the logical S-VLAN structure of the network 10 has been defined, that an inventory of the network equipment has been stored and is accessible, preferably including all the equipment types represented in the access, aggregation and core network portions of the network 10 in FIG. 1, and that the network addresses of all the CPE devices 15 involved in the operation of the invention are stored and are accessible. Preferably, an inventory of network equipment is provided in a database stored on an inventory server and includes information defining the network nodes for each S-VLAN, an extract from such a database being shown by way of example in FIG. 2.

Referring to FIG. 2, a portion of an S-VLAN table is shown, indicative of the content of an inventory database of network equipment, providing an identifier for each of the different types of equipment associated with a logical S-VLAN—from the AMSAN 35 and FMSAN 45, to the core network EEA and IEA switches 55, 60 that link to the BRAS 20—and the geographical area in which each equipment instance is located. However, the inventory database also defines the configuration detail for the interconnection of equipment types, including port identifiers used on each equipment instance to make the interconnections. More specifically the database, as represented by the table 100 in FIG. 2, provides: an identifier 105 for each logical S-VLAN; an identifier 110 for the associated BRAS 20 together with the BRAS port 115 that links to the respective IEA switch 60; the geographical area code 120 in which the identified BRAS equipment 20 is located; a Multi-Technology Operations Systems Interface (MTOSI) port name 125 identifying a relevant network card and port on the BRAS 20. The IEA switch 60 is defined by an identifier 130, its geographical area code 135 and the IEA port 140 that links it to the identified BRAS (110). Similarly, at the other side of the core MPLS network 50, the EEA switch 55 is similarly defined by its identifier 145, its area code 150 and the EEA port 155 that links to an associated FMSAN 45. The associated FMSAN 45 is defined by an identifier 160, its area code 165, the FMSAN port 170 that links to the EEA switch 145 and the FMSAN port 175 that links to an associated AMSAN 35 at an edge of the aggregation network. The AMSAN 35 is defined by its identifier 180, its area code 185 and the AMSAN port 190 that links to the FMSAN 160. All these data are stored in the database for each defined S-VLAN.

The connectivity analysis process will now be summarised with reference to a flow diagram as shown in FIG. 3 and with continuing reference to FIG. 1.

Referring to FIG. 3, the connectivity analysis process begins at STEP 70 by determining and selecting, for each S-VLAN defined in the table represented in FIG. 2, a statistically significant sample of those CPE devices 15 served by the S-VLAN. If it is intended to provide a data retrieval and processing platform capable of obtaining and processing data from every CPE device 15 connected to the network 10, then the sampling STEP 70 may be omitted as such, given that all associated CPE devices 15 served by a particular S-VLAN will be included in the sample. At STEP 75, a process begins of remotely determining the connectivity of each CPE device 15 in the S-VLAN samples over one or more predetermined and statistically significant time periods, at regular intervals, for example every 5 minutes. Connectivity is determined by retrieving a predetermined set of data from each CPE 15 over an IP connection established with the CPE device 15 through the network 10. Preferably, the time periods may comprise 1 hour periods so that the mean value of the connectivity measurements obtained during each hour are calculated and stored to provide a connectivity profile for each S-VLAN. However, different lengths of time period may be highlighted to focus the analysis on shorter periods of time, such as during normal working hours when a more sharply varying but nevertheless consistent profile of connectivity is observed within certain one hour periods, whereas at other times taking an average over a two or three hour period would provide an appropriate level of resolution in the connectivity profile.

Each sample CPE device 15 executes a software agent arranged to derive and collect a predetermined set of data relating to the operation of the device 15, preferably compliant with a published standard described in two Technical Reports published on the Internet by the Broadband Forum at http://www.broadband-forum.org—TR-098: Internet Gateway Device Data Model for TR-069, and TR-069: CPE WAN Management Protocol (CWMP). CWMP is an application layer protocol for remote management of end-users' devices and may be used in the present invention to communicate with any compliant sample CPE device 15 to poll for a predetermined set of parameters, selected from those defined in the TR-098 Data Model. The results of the monitoring at STEP 75 are used at STEP 80 to generate a connectivity model for each S-VLAN based upon average levels of CPE connectivity over the predetermined time periods, and other metrics to take account of error conditions and other conditions encountered during monitoring which may need to be considered when interpreting observed connectivity levels.

Having established models of S-VLAN activity in what may be referred to as a 'training phase', at STEP 85 the connectivity of each CPE device 15 in each of the samples is monitored and variations in aggregated S-VLAN connectivity from model connectivity levels are interpreted using one or more predetermined rules to decide whether a fault condition is indicated for any S-VLAN. At STEP 90, if a fault condition is identified, knowledge of the physical and logical network topology and any alarm data generated by specifically identified network equipment is used to determine a potential source of the fault. The results of these analyses are reported, at STEP 95, and the network operator may then trigger appropriate remedial actions.

The connectivity models of each S-VLAN may be continually updated to take account of natural changes to the network, its customer base and their use of the network so that variations are determined with reference to valid data, reducing the chance that fault conditions are falsely identified. In practice, the data captured at STEP 85 during the routine monitoring of CPE connectivity are used to make regular updates to the connectivity models.

The summarised process of FIG. 3 will now be explained in more detail, beginning with STEP 70 at which a CPE sample set is selected for each S-VLAN. An S-VLAN may comprise of the order of $10^3$ customer CPE devices linked through an associated AMSAN 35 or single layer aggregation network, although different grouping criteria may be applied by different network operators. One of the objectives for the connectivity analysis process is to be able to model the average level of 'connectivity' of each S-VLAN observed over a predetermined set of time periods in order to be able to identify statistically significant variations in that connectivity if measured over an equivalent future time period, thereby to recognise a potential fault condition in the network. If only a sample of the connected CPE devices 15 is to be used to generate the connectivity models at STEP 80 for each S-VLAN, then a sufficiently large and representative sample of customers' CPE devices 15 needs to be chosen so that a predetermined level of stability can be achieved in the measured mean S-VLAN connectivity over those time periods. Standard statistical sampling techniques may be used, if necessary derived over one or more iterations, to select a statistically significant sample of CPE devices 15 for each S-VLAN. In this way, mean levels of 'connectivity' may be calculated for a given time period, for example a one hour period during a normal working day morning, which are likely to have a relatively stable mean if measured repeatedly over the same time period, e.g. over a number of working day mornings.

Of course, as mentioned above, if a platform with sufficient data capture, data processing and data storage capability is to be provided, and if the network capacity is sufficient to ensure that service performance is not significantly affected, then all connected CPE devices 15 with the capability to supply parameters compliant with the TR098 data model may be included in the samples. If all connected CPE devices have this capability, there would be no requirement to be selective and STEP 70 may be omitted. However, for the purposes of monitoring average S-VLAN connectivity, analysis based upon a representative sample of CPE devices 15 is generally considered sufficient.

At STEP 75, the remote monitoring of CPE 'connectivity' for CPE devices in each S-VLAN sample is achieved using the above-referenced CPE WAN Management Protocol (CWMP). The IP addresses of all the CPE devices 15 in each of the samples are stored and may be accessed so that a remote connection can be established over the service provider's IP network 10 with any required CPE device 15, following substantially the same path through the network as used to supply broadband service to the CPE device 15 from the BRAS 20. A batch of request messages may be generated and addressed for transmitting over each established IP connection to retrieve a predetermined set of parameters. In particular, each request message may comprise a set of CWMP 'GetParameterValues' (GPV) messages, one for each required parameter key. Transmission of GPV messages may be controlled to take account of any limitation in the handling of parameter requests by a CPE device, and to recognise error messages, so that message re-transmissions are minimised. Preferably a queuing arrangement may be implemented for parameter request messages and a controller may be arranged to pick respective messages from the queue to send to each CPE device 15 only upon receipt of a response to a previous request message. In general, the objective is to determine a binary result of connectivity 'on' or connectivity 'off' for each CPE device 15 to which a batch of request messages is sent.

Besides considering the different time periods over which average levels of S-VLAN connectivity are to be calculated, as discussed above, the monitoring time interval within those time periods may also be adjusted according to the observed statistical significance of variations in S-VLAN connectivity over the corresponding time period. For example, a possibly longer time interval may be justified, for example outside normal working hours, if measures of average S-VLAN connectivity based upon the shorter 5 minute interval during those times periods is found to have a similar statistical variance to measures based upon a 20 minute monitoring interval. Appropriate selection of monitoring time interval may reduce any likely impact upon network and CPE performance at particular times of day due to the selected level of data capture activity.

Figure 4:
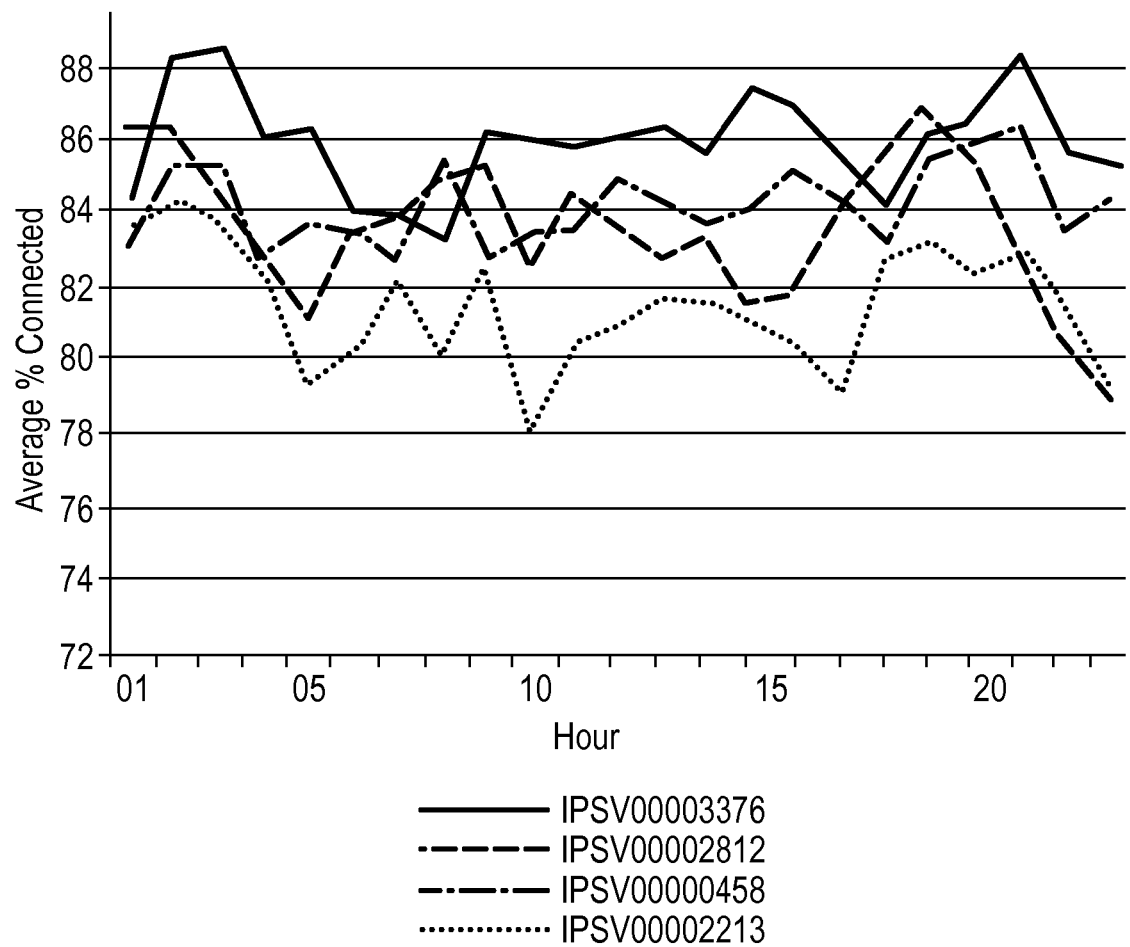
FIG. 4 is a graph showing an example of average S-VLAN connectivity over a predetermined set of time periods.

A preferred set of device parameter keys selected from those defined in TR-098: Internet Gateway Device Model for TR-069 (for example Version 1.1 of the data model, referenced above) to indicate whether CPE and hence S-VLAN connectivity is 'on' or 'off' is as follows:
  CurrentLocalTime
  Modem FirmwareVersion At STEP 80, the generation of connectivity models takes the connectivity measures from STEP 75 at the selected monitoring time intervals and determines the average level of connectivity for each S-VLAN over each of the predetermined time intervals for a given monitoring period, and the variance. For example, referring additionally to FIG. 4, the average connectivity of four S-VLANs is shown in graphical form over each of the 24 hours in a typical working day (Monday to Friday), preferably using data retrieved at the same times over several working days. From these statistics, a minimum and a maximum threshold level of connectivity may be determined for each S-VLAN over each such time period taking account of the variance. The threshold values, together with any other metrics captured at STEP 75 are stored in respective connectivity models for each S-VLAN. These threshold levels of connectivity and the other metrics may then be used as a basis for judging the significance of future observed variations in S-VLAN connectivity level over equivalent time periods.

At STEP 85, connectivity levels are monitored for the CPE devices 15 in each S-VLAN sample using the same parameters, listed above, and over the same predetermined time periods. One or more predetermined rules are then applied to interpret the observed connectivity levels with reference to the respective S-VLAN connectivity models to determine whether any observed variation outside threshold levels is significant and therefore indicative of a fault condition. The predetermined rules may include business-specific criteria for assessing the significance of an observed variation. For example, a preferred rule may take account of currently observed error levels encountered when attempting to connect with CPE devices 15 and may interpret these observed error levels with respect to historical error levels stored in the connectivity models, besides looking at average connectivity amongst CPE devices 15 for which there was no error response.

A user interface is typically provided to enable the results of the above analysis to be presented, for example, to network management or operations staff acting for the network operator to interpret the potential fault conditions reported at STEP 90 with reference to other information available through existing network management systems. In particular, the inventory of the equipment involved in providing broadband services over a particular S-VLAN, for example as shown in FIG. 2, enables an operator to identify the particular items of equipment involved when an S-VLAN is shown to be experiencing abnormal connectivity levels. This enables the operator to focus their attention on equipment faults being generated by those particular items of equipment in order to locate the most probable cause of the S-VLAN connectivity variation.

Whereas only two TR-098 parameters are suggested above for the purpose of determining CPE device 'connectivity', further parameters may be retrieved to support different measures of CPE device status, for example to highlight network capacity issues, as would be apparent to a person of ordinary skill in the relevant art.

Turning now to one particular variation on what can be achieved by retrieving a richer set of TR-098 parameters—the analysis of service status or service performance—a preferred process will now be described for assessing the service status of one or more customers' CPE devices 15. This approach is intended to complement the connectivity-based analysis described above in that, while connectivity monitoring can help to identify service-affecting fault conditions in the wider network, a customer's experience of accessing the broadband service may be affected by more local problems which may not show up through connectivity monitoring alone. Examples of such problems include poor condition of copper line plant 40 causing bandwidth limitations beyond those expected, or configuration errors in network equipment. The detection and diagnosis of such performance-affecting conditions is the aim of this second type of analysis.

The preferred process comprises two main functional steps:
  1) generation, in a 'training phase', of a 'model' representation of acceptable service status for each CMSAN 30, from the perspective of customers' CPE devices 15 served by it;
  2) identification of variations from acceptable service status for one or more CPE devices 15 based upon a comparison of subsequently obtained parameter readings with the modelled representations of acceptable status.

The process of service status analysis will firstly be described in outline with reference to FIG. 5 and the different steps in the process will then be described in more detail.

Referring to FIG. 5, the process begins at STEP 300 with the selection, for each CMSAN 30, of a representative sample of n customers' CPE devices 15 from those supported by the CMSAN 30. The sample may comprise all or substantially all of the CPE devices 15 supported by a CMSAN 30 if required and appropriate.

Using an equivalent remote parameter data retrieval technique as for the connectivity analysis above, each of the n CPE devices 15 is accessed remotely, at STEP 305, at each of m time points separated by a predetermined time interval, e.g. at 5 minute intervals over a monitoring period of 24 hours, to retrieve parameter values for each in a different predetermined set of p parameters, to provide m sets of p parameter values for each of the n CPE devices 15.

Having retrieved a dataset of parameter values for a CMSAN sample of CPE devices 15, at STEP 310 a model representation of acceptable service status is generated based upon an analysis of the way in which parameter values vary over time for the CPE devices 15 served by the CMSAN 30. In generating the model, the aim is to identify characteristic patterns of variation in the values of the parameter set that may be defined and form the basis for comparison with subsequent measurements of individual CPE device service status, enabling potentially unacceptable service status to be recognised.

At STEP 315, having defined what acceptable service status looks like for each CMSAN 30, individual CPE devices 15 may be monitored either as part of a scheduled activity or in response to a reported potential fault condition by the respective user. The same set of p parameters as used to generate the models at STEP 310 are retrieved from the CPE device 15 and processed to provide a measure of service status for that device that may be compared with the model representation of acceptable service status for the respective CMSAN. If, at STEP 320, a comparison indicates that the measured service status is not acceptable, then a potential fault condition may be generated to prompt further attention by a network operator.

The process outlined with reference to FIG. 5 will now be described in more detail, beginning with the parameter data retrieval STEP 305.

A representation of service status, from the perspective of a user's CPE device 15, has been devised by the inventors in the present case based upon a different and more extensive subset of parameters selected from the TR-098 data model, referenced above, to that used to determine connectivity status. A set of parameters has been selected from four TR-098 parameter groups as being most likely to contribute to an indication of service status for a given CPE device 15. In a preferred embodiment, a set of parameters is listed for reference in FIG. 6. It is intended that the same set of parameters be used both for model generation at STEP 310 and for subsequent monitoring at STEP 315. Referring to FIG. 6, the selected parameter groups comprise System Parameters, Network Interface Parameters, IP Interface Parameters and DSL parameters. A preferred set of parameter keys have been selected and are listed from each group.

At STEP 305, the values for all of the p (equal to 57 in this embodiment) parameters listed in FIG. 6 may be retrieved at e.g. 5 minute intervals over connections established through the service-provider's network 10 with each CPE device 15 selected at STEP 300. As for the connectivity analysis process above, parameter values may be retrieved in response to a series of CWMP 'GetParameterValues' (GPV) messages. The resulting dataset may be represented as a matrix P of m rows and p groups of n columns of parameter values $p_{ijk}$ ($i \in \{1, \ldots, p\}$, $j \in \{1, \ldots, n\}$, $k \in \{1, \ldots, m\}$) for each CMSAN 30 so that each row in the matrix P provides a snap-shot at a particular time of the status of each of the CPE devices 15 in one CMSAN sample.

At STEP 310, a preferred approach to modelling acceptable service status is to apply a Principal Component Analysis (PCA) technique as described, for example, in the book "Principal Component Analysis" by I. T. Jolliffe, published by Springer (ISBN 978-1-4419-2999-0). The aim of this approach is to identify the principal directions in which the values of the selected p parameters vary over time for a given CMSAN 30 on the assumption that substantially all the CPE devices in a respective sample are experiencing an acceptable service status at the time of parameter retrieval. The PCA technique enables a parameter dataset in the form of a matrix P to be projected into a coordinate system whose axes are defined by the principal components for the matrix P. Distinct regions of variation may become apparent in the projected dataset and enable a model of acceptable service status to be defined in terms of those regions for the respective CMSAN 30.

A first step towards the identification of principal components for a dataset P is to calculate a correlation matrix for the dataset matrix P. By working with the full dataset rather than, for example, average values for parameters over the different CPE devices 15, there is no loss of information. Any variation in behaviour due to the different types of CPE device 15 may be revealed by the analysis rather than disguised through averaging.

To calculate the correlation matrix, the parameter values of the matrix P are firstly converted to standardised form to generate a matrix Z according to $$z_{ijk} = \frac{p_{ijk} - \mu_{ij}}{\sigma_{ij}}$$

where $\mu_{ij}$ is the mean of the measured values for parameter i for CPE device j over the m measurements and $\sigma_{ij}$ is the standard deviation in those m measurements. The correlation matrix C for the dataset matrix P is then the covariance matrix of the standardised matrix Z, calculated according to the expression $$C = \frac{1}{m-1} Z^T Z$$

where $Z^T$ is the transpose of the matrix Z.

The principal directions of variation in the parameter measurements are represented by the eigenvectors of the correlation matrix C. The eigenvalues and the eigenvectors of the correlation matrix C are calculated and a matrix φ is generated comprising the eigenvectors $\underline{\phi}_i$ of the correlation matrix C, preferably normalised so that they form an orthonormal basis, and arranged as columns ($\underline{\phi}_1 \underline{\phi}_2 \ldots \underline{\phi}_p$) ordered by decreasing size of the corresponding eigenvalue. The eigenvector $\underline{\phi}_1$ therefore corresponds to the largest eigenvalue, $\underline{\phi}_2$ to the second-largest eigenvalue, and so-on.

The transpose $\phi^T$ of the matrix $\phi = (\underline{\phi}_1 \underline{\phi}_2 \ldots \underline{\phi}_p)$ is then used to project the n groups of p parameter readings of the dataset matrix P, by the multiplication $\phi^T P$, into a coordinate system whose axes are defined by the eigenvectors $\underline{\phi}_i$, $i \in \{1, \ldots, m\}$. In particular, each row of n groups of p projected parameter values may be represented in a respective component plot of projected values comparing projected values along selected pairs of principal component directions. For example, if the first four principal components are designated PC1, PC2, PC3 and PC4, corresponding to the eigenvectors $\underline{\phi}_1, \underline{\phi}_2, \underline{\phi}_3$ and $\underline{\phi}_4$ respectively, the first four rows of the projected values matrix $\phi^T P$ represent the respective projected parameter values in those four principal component directions. By plotting respective combinations of the first four rows of the matrix $\phi^T P$, the six different combinations: PC1/PC2; PC1/PC3; PC1/PC4; PC2/PC3; PC2/PC4; and PC3/PC4, may be represented as component plots.

Typically, one or more distinct regions may be identified in the component plots in which points are clustered together, each region representing a mode of acceptable operation for the CMSAN 30. If the sampled CPE devices 15 are known to be experiencing acceptable service performance, then the boundaries of each distinct region may be defined in terms of acceptable ranges for projected values, providing a basis for determining the acceptability of service status for any CPE device 15 in the same CMSAN group at some future time.

At STEP 315, if m sets of readings for the p parameters are retrieved from a particular CPE device 15, preferably at the same m predetermined time intervals and over a similar monitoring period as used to generate the 'model' component plots, the retrieved values may be projected using the eigenvectors for the corresponding CMSAN model to give a measure of service status for the device. The resultant points may be plotted on model component plots to enable a visual comparison of their position relative to the distinct regions of acceptable service status. Alternatively, the projected values may be compared numerically to determine their positions relative to the regions of acceptable service status. At STEP 320, a newly plotted point that clearly falls outside one of those regions is therefore likely to represent a CPE device 15 experiencing a different level of service performance which may be determined by an operator as being unacceptable, prompting further investigation and diagnosis. The determination of whether or not newly plotted points fall within regions of acceptable service performance may be included within an automated fault reporting process, taking account of the type of CPE device and any other factors that may identify which region of acceptable performance applies to the particular CPE device under investigation.

Further types of analysis may be carried out to recognise service-affecting conditions which are not necessarily due to network faults; more likely due to equipment configuration errors. One particular service-affecting condition may be an incorrectly configured bandwidth at one of the network equipment types, potentially affecting service performance for one or many customers. In a preferred embodiment, one further type of analysis is directed to determining a model of expected S-VLAN bandwidth utilisation at different times of day based upon a determination of the average level of DSL traffic carried over each SVLAN, for example averaged over successive 60 minute periods. The S-VLAN bandwidth utilisation may then be monitored at, say, 5 minute intervals and compared with the expected utilisation for the respective 60 minute period. Any significant shortfall may be indicative of a bandwidth constraint due to a network fault or a configuration error.

The same sample of CPE devices 15 may be used to determine bandwidth utilisation for each S-VLAN as used for the monitoring of connectivity status, described above. However, for this analysis, parameters are retrieved from each CPE device 15, e.g. at 5 minute intervals, indicating the received number of bytes of data at that device. In a 'training phase' the monitored bandwidth utilisation estimate for the whole S-VLAN is scaled up from the sample totals and averaged over respective 1 hour periods to give a model profile of bandwidth utilisation for the S-VLAN. The same measurements of CPE device byte counts are retrieved on an ongoing basis from the sample of CPE devices 15 and a substantially real-time determination of bandwidth utilisation for each S-VLAN may be compared with the model expected bandwidth utilisation for the respective 1 hour period to check for any significant shortfall. Any significant variation may trigger investigation for a possible configuration or other bandwidth-affecting condition on any of the equipment known to be involved for the affected S-VLAN.

A preferred network monitoring system will now be described with reference to FIG. 7 in which the various analyses described above may be implemented. Network monitoring systems such as this would typically be implemented and operated by communications network operators, either as stand-alone facilities or integrated within a wider network management system. It is intended through this example to highlight a number of functional elements of a system required to enable the present invention to operate. Some of these elements will already be available in some form in existing systems and may be modified to enable the requirements of the present invention to be supported, as will be apparent to a person of ordinary skill from the description that follows.

Figure 7:
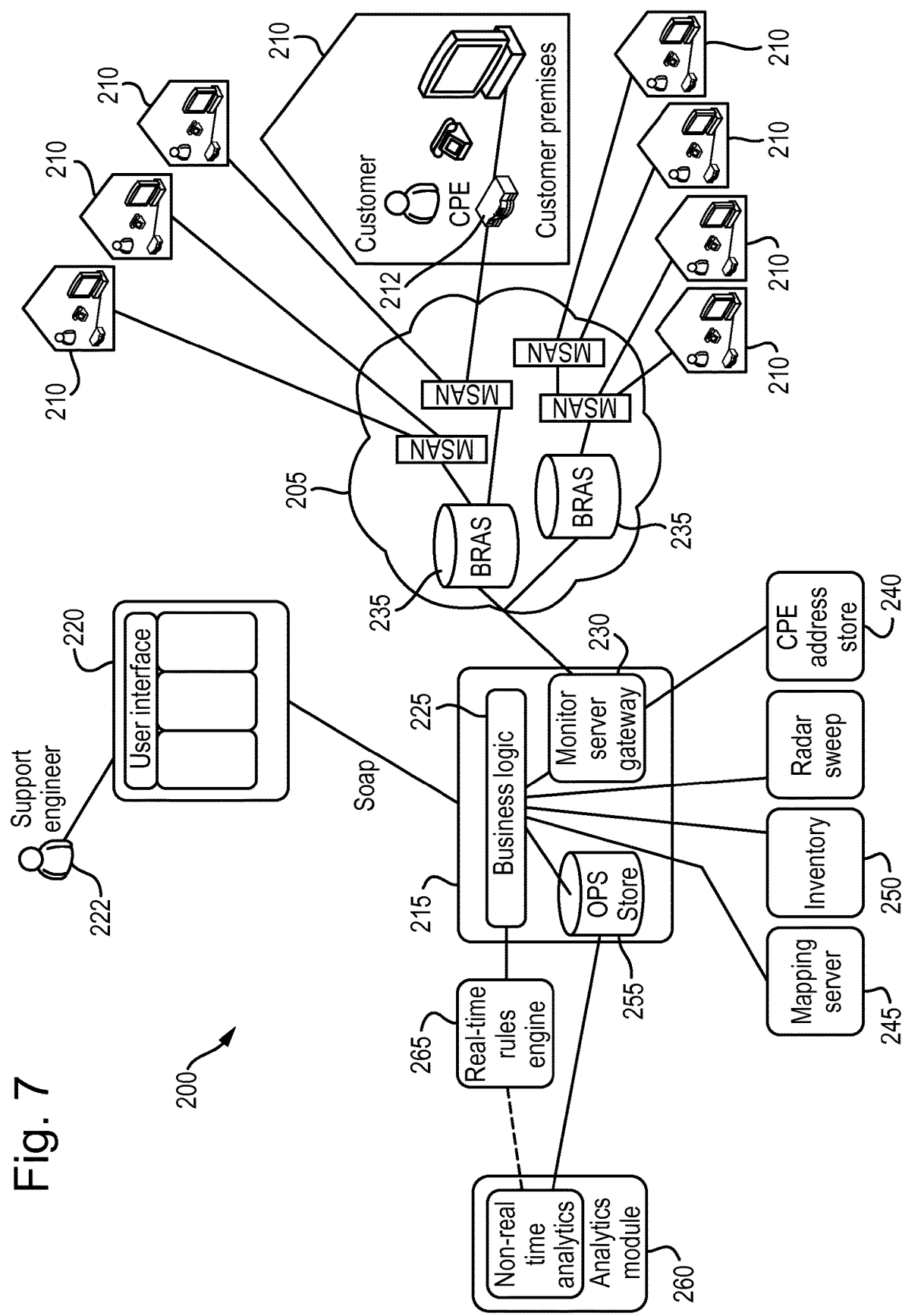
FIG. 7 shows a preferred system architecture according to a preferred embodiment of the present invention.

Referring to FIG. 7, a preferred system 200 is shown and will be described from two main aspects: those elements involved in retrieval of parameter data from customers' CPE; and those elements relevant to the data processing requirements of the different types of analysis described above. There is a third aspect relating to a preferred user interface and this will be described in outline only as the detailed requirements of each application are likely to be different.

Beginning with data retrieval, the system 200 in FIG. 7 comprises a network operator's IP network 205 having a similar architecture to that of the network 10 in FIG. 1, arranged to provide broadband IP services to customers 210, in particular to customers' CPE devices 212. A CPE Monitoring and Management Module 215 is provided to control the retrieval of parameter data from CPE devices 212, to apply the different types of analysis described above to the retrieved data and to supply information to a User Interface module 220 for display to a support engineer 222 or other category of user. In particular, a Business Logic module 225 is provided to implement the main control functions of the system.

As regards parameter data retrieval, the Business Logic module 225 is linked to a Monitor Server Gateway 230 having an interface for linking to the network 205 and for establishing IP connections through that network with selected CPE devices 212. Besides performing the functions described above for the retrieval of parameter data from customers' CPE devices 212, the Gateway module 230 is also arranged to implement a range of necessary security measures to prevent unauthorised communication with the Network 205 and with any of the customers' CPE devices 212. The Gateway module 230 is arranged with access to a CPE Device Address Store 240 containing IP or other network addresses for each customer's CPE device 212 served by the network 205. This enables the Gateway module 230 to establish connections through the network 205 between a BRAS 235 and any selected CPE device 212 so that the parameter data may be captured to determine connectivity, service status and any other measure through the same communications path as used to deliver broadband IP services to the selected CPE device 212.

The Business Logic module 225 is arranged with access to further database stores, including a Mapping Server 245 and an Inventory 250 of the equipment incorporated in the network 205. Those data discussed above with reference to FIG. 2 may be stored and obtained from those database stores. Of specific interest for data retrieval purposes, the Business Logic module 225 is arranged to trigger the retrieval of parameter data at predetermined time intervals, enabled by certain data obtained from the inventory to be used by the Gateway module 230 to access CPE devices in each logical S-VLAN.

The CPE Monitoring module 215 also includes an Operational Database 255 to store, amongst other data, retrieved parameter data prior to processing and analysis. However, the Operational Database 255 may also store results from the different types of analysis, in particular, model connectivity profiles for each S-VLAN and model service status data for each CMSAN 30, as described above.

The Business Logic module 225 is arranged to trigger the execution of the different analysis processes described above by an Analytics Module 260 which provides both real-time and non-real-time processing of retrieved parameter data. A Real-Time Rules Engine 265 is also provided to interface with the Business Logic module 225 to apply predetermined rules of interpretation of results from the Analytics Module 260, in particular to recognise a fault condition in the network 205. The particular rules applied by the Rules Engine 265 are preferably customised according to particular characteristics of the network 205 and its behaviour, for example to ensure that certain observed conditions implied by the results of the analyses are not misinterpreted.

The Operational Database 255 may also store three or more years' historical data, ranging from raw parameter data to certain results of the analyses to help in the interpretation of the results of subsequent measurements and analyses. For example, certain rules implemented by the Rules Engine 265 may take account of historical observed error levels arising in certain parts of the network 205 when interpreting analysis results to ensure that normal behaviour is not mistaken for a new fault condition. Historical data may also be used in an analysis of trends, geographical correlations and movements in the models of acceptable service performance to help operators to understand and predict the impact of certain types of network change on users' experience of service performance.

The User Interface module 220 provides visibility of the results of the different analyses at whatever level of resolution, section of the network 205 or geographical area is appropriate to the role of a particular user 222. The User Interface 220 may provide means for a user 222 to trigger certain types of investigatory analysis, for example to look at the service status relating to a particular customer's CPE device 212. The presented results of any such analyses may also be supplemented by relevant data supplied by the Business Logic module 225 from the Mapping Server 245 or the Inventory 250 to enable a user 222 to diagnose and locate a potential source of a reported fault condition.

In an implementation of the system 200 in which the functionality of the present invention is integrated with other network management functions of the network operator, certain results of the analyses described above may be correlated with alarm data received from the specific instances of equipment in the network 205 to help with the localisation of fault conditions reported by those analyses. Data and results supplied by network probes may also be combined and correlated with the results of these analyses to improve the diagnosis and location of the sources of faults. The User Interface 220 may further transform the various analysis results into a form required to report network performance measures being used by the network operator or service provider. Further features and functionality appropriate to a Support Engineer 222 and the wider interests of the network operator or service provider may be provided through the User Interface 220, supported by the various techniques and analyses of the present invention, as would be apparent to a person of ordinary skill in the relevant art.

Preferred embodiments of the present invention have modelled and monitored 'connectivity' and 'service status' as a basis for detecting fault conditions and for monitoring communications performance over a network. However, it would be apparent to a person of ordinary skilled in the data communications field in particular that various other combinations of the available parameters generated at a user's network termination equipment may be selected to support further types of 'operational status, network management and user behavioural analysis, relying upon the 'view from the edge' of a network provided by the present invention, optionally in combination with other sources of data.

The invention claimed is:

1. A method for detecting a fault condition in a network, the network having a plurality of network users each having, linked to the network, a network termination device for accessing services over the network, the method comprising the steps:

(i) remotely establishing a connection through the network to the network termination device of each of a plurality of predetermined sets of the plurality of network users, each said connection following a path through network nodes of the network used by the respective network termination devices to access said services over the network, each of the predetermined sets of network users being within a different predefined particular geographical area defined by a corresponding aggregation network node;

(ii) defining physical and logical topologies of the network nodes of each connection path of each of the predetermined sets of network users from a structure of the network stored in a database;

(iii) in a first monitoring phase, monitoring connectivity status of the respective network termination devices following a connection path with respect to the defined physical and logical topologies of each connection path used to supply said services to a statistically significant sample of each of the predetermined sets of network users, the monitoring being at predetermined time intervals within one or more predetermined time periods to retrieve parameter data generated by the respective network termination devices of each connection path, the parameter data comprising values of a first predetermined set of parameters indicative of a measure of the connectivity status of the respective network termination devices of each connection path with respect to the network;

(iv) adjusting the predetermined time intervals according to an observed statistical significance of variations in connectivity for each of the predetermined sets of network users over the corresponding one or more predetermined time periods and continuing the first monitoring phase over the adjusted time intervals;

(v) applying one or more types of analysis to the retrieved parameter data obtained in the first monitoring phase to generate a different model of expected device connectivity for the respective network termination devices for each of the predetermined sets of network users;

(vi) in a second monitoring phase, remotely retrieving values for said first predetermined set of parameters from a network termination device of a selected network user in a corresponding predetermined set of the plurality of network users and comparing the measure of connectivity status derived from the retrieved parameter values for the selected network user with an expected measure of device connectivity for the corresponding predetermined set of the plurality of network users indicated by the corresponding different model of device connectivity generated at step (v) for the selected network user thereby to identify a variation in connectivity status for the selected network users network termination device indicative of a fault condition in the network; and (vii) determining a network node location of the variation in connectivity status indicative of the fault condition with respect to the defined physical and logical network topologies of the connection path of the selected network user's network termination device.

2. The method according to claim 1 wherein, at step (i), the predetermined sets of network users comprise users having access to said services over a particular portion of the network.

3. The method according to claim 2 wherein, at step (v), the corresponding different models are models generated in respect of a portion of the network associated with the selected user's network termination device.

4. The method according to claim 1, wherein said first predetermined set of parameters includes a parameter indicative of at least one of: time; date; and a software or firmware version number for the respective network termination device.

5. The method according to claim 1, wherein:
at step (iii), the parameter data further comprises a second predetermined set of parameters selected as being indicative of a measure of service status for each respective network termination device;
at step (v), said one or more types of analysis are further arranged to generate one or more models of expected service status for the network termination devices of the predetermined sets of network users;
at step (vi), the second monitoring phase further comprises remotely retrieving values for said second predetermined set of parameters from a network termination device of the selected user and comparing the measure of service status derived from the second retrieved parameter values for the selected user with an expected measure of service status for the corresponding predetermined set of the plurality of network users indicated by the corresponding one or more models of expected service status generated at step (v) thereby to identify a variation in service status for the selected user's network termination device indicative of a fault condition in the network, and
at step (vii), determining a network node location of the variation in service status indicative of the fault condition with respect to the defined physical and logical network topologies of the connection path of the selected network users network termination device.

6. The method according to claim 5 wherein, at step (v), said one or more types of analysis include the application of principal component analysis to retrieved parameter data for said second set of parameters and wherein step (v) further comprises generating one or more models characterizing service status for the network termination devices of said predetermined sets of network users in terms of one or more determined regions of acceptable service status in a space defined by the principal components of retrieved parameter data for said second set of parameters.

7. The method according to claim 6, wherein step (vi) further comprises projecting the retrieved parameter data for said second set of parameters into the space defined by the principal components calculated at step (v) and comparing a position of the projected data with the one or more determined regions of acceptable service status thereby to identify a variation indicative of a fault condition in the network.

8. The method according to claim 5, wherein the measure of service status is indicative of communications performance over an access network portion of the network and wherein the parameters of said second set of parameters are selected as being indicative of communications performance over that portion of the access network that links to the selected network user's network termination device.

9. The method according to claim 8, wherein the access network comprises copper lines linking the network termination devices of said predetermined sets of network users to the network and wherein said second set of parameters include parameters indicative of communications performance over a respective copper line.

10. The method according to claim 1, wherein the network is an internet protocol network and wherein said parameter data comprises one or more parameters defined in a standard data model for internet gateway devices.

11. An apparatus for detecting fault conditions in a network, the network having a plurality of network users each having, linked to the network, a network termination device for accessing services over the network, the apparatus comprising:
a computer implemented data retrieval logic module having an interface to the network and configured to:
establish a communications link to the user network termination device of each of a plurality of predetermined sets of the plurality of network users, each said link following a path through network nodes of the network used by the respective user network termination devices to access services over the network, each of the predetermined set of network users being within a different predefined particular geographical area defined by a corresponding aggregation network node;
to define physical and logical topologies of the network nodes of each path from a structure of the network stored in a database;
to monitor connectivity status of the network termination devices following a connection path with respect to the defined physical and logical topologies of each path used to supply said services to a statistically significant sample of each of the predetermined set of network users, the monitoring being at predetermined time intervals within one or more predetermined time periods to retrieve parameter data generated by the respective network termination devices of each path, the parameter data comprising values for a first predetermined set of parameters indicative of a measure of the connectivity status for the respective network termination devices of each path with respect to the network; and
to adjust the predetermined time intervals according to an observed statistical significance of variations in connectivity for each of the predetermined sets of network users over the corresponding time periods and to continue the first monitoring phase at the adjusted time intervals;

a computer implemented analysis logic module configured to apply one or more types of analysis to parameter data retrieved by the data retrieval logic module from the network termination devices of each of the predetermined sets of network users and to generate a different model of expected device connectivity with respect to at least a portion of the network accessed by each of said predetermined sets of network users;

a computer implemented rules engine configured to compare the measure of connectivity status derived from values for the first predetermined set of parameters retrieved by the data retrieval logic module from the network termination device of a selected network user in a corresponding predetermined set of the plurality of network users with an expected measure of device connectivity for the corresponding predetermined set of the plurality of network users indicated by the corresponding different model of device connectivity for the selected user and to recognize a fault condition in the network in response to the derived measure of connectivity status for the selected user's network termination device diverging from an expected device connectivity indicated by the corresponding said model; and a computer implemented diagnostic logic module configured to determine a network node location of the fault condition indicated by the diverging measure of connectivity status with respect to the physical and logical network topologies of the path of the selected user's network termination device.

12. The apparatus according to claim 11, wherein said first predetermined set of parameters includes parameters indicative of at least one of: time; date; and software or firmware version number for a respective network termination device.

13. The apparatus according to claim 11, wherein:

the parameter data retrievable by the data retrieval logic module further comprises a second predetermined set of parameters indicative of a measure of service status of each respective network termination device;

the analysis logic module is arranged to generate one or more models of expected device service status from retrieved values of said second set of parameters with respect to at least a portion of the network accessed by said predetermined sets of network users;

the rules engine is arranged to compare the measure of service status derived from values for the second predetermined set of parameters retrieved by the data retrieval logic module from the network termination device of the selected user with an expected measure of service status for the corresponding predetermined set of the plurality of network users indicated by the corresponding one or more models of expected device service status and for recognising a fault condition in the network in the event that the derived measure of service status for the selected user diverges from the expected service status indicated by the corresponding said one or more models of expected service status; and a computer implemented diagnostic logic module configured to determine a network node location of the fault condition indicated by the diverging measure of service status with respect to the physical and logical network topologies of the path of the selected user's network termination device.

14. The apparatus according to claim 13, wherein said second set of parameters comprise parameters indicative of at least one of; number of data packets received; number of data packets sent; data rate; data errors; noise; and signal attenuation over a respective link from the network termination device to the network, in particular over a copper line.

15. A network management system configured to implement the method according claim 1.

16. A non-transitory computer program product comprising a data carrier having stored thereon computer program code which when loaded and executed on a computer are arranged to implement the method according to claim 1.

* * * * *